United States Patent
Overcash et al.

(10) Patent No.: US 10,129,592 B2
(45) Date of Patent: Nov. 13, 2018

(54) AUDIENCE MEASUREMENT AND FEEDBACK SYSTEM

(71) Applicant: Cisco Technology, Inc., San Jose, CA (US)

(72) Inventors: Michael Overcash, Duluth, GA (US); John Creecy, Suwannee, GA (US)

(73) Assignee: Cisco Technology, Inc., San Jose, CA (US)

( * ) Notice: Subject to any disclaimer, the term of this patent is extended or adjusted under 35 U.S.C. 154(b) by 32 days.

(21) Appl. No.: 15/285,533

(22) Filed: Oct. 5, 2016

(65) Prior Publication Data

US 2018/0098119 A1   Apr. 5, 2018

(51) Int. Cl.
  *H04N 21/442*   (2011.01)
  *H04N 21/44*   (2011.01)
  *H04N 21/6587*   (2011.01)
  *H04N 21/25*   (2011.01)

(52) U.S. Cl.
  CPC ..... *H04N 21/44222* (2013.01); *H04N 21/251* (2013.01); *H04N 21/44008* (2013.01); *H04N 21/6587* (2013.01)

(58) Field of Classification Search
  None
  See application file for complete search history.

(56) References Cited

U.S. PATENT DOCUMENTS

| | | | |
|---|---|---|---|
| 7,672,864 B2 | 3/2010 | Nair et al. | |
| 8,065,697 B2 | 11/2011 | Wright et al. | |
| 8,595,375 B1 | 11/2013 | Kuznetsov | |
| 8,683,504 B2 | 3/2014 | Ramaswamy | |
| 8,798,170 B2 | 8/2014 | Kusunoki | |
| 8,943,527 B2 | 1/2015 | Ghashghai et al. | |
| 8,959,540 B1 | 2/2015 | Gargi et al. | |
| 9,021,543 B2 | 4/2015 | Zaslavsky et al. | |
| 9,465,435 B1 * | 10/2016 | Zhang | G06F 3/01 |
| 9,661,384 B1 * | 5/2017 | Franzini | H04N 21/44222 |
| 2009/0063214 A1 | 3/2009 | Liu | |
| 2012/0054237 A1 | 3/2012 | Poupko et al. | |
| 2012/0124606 A1 | 5/2012 | Tidwell et al. | |
| 2015/0333986 A1 | 11/2015 | Pang et al. | |
| 2015/0341812 A1 | 11/2015 | Dion et al. | |
| 2017/0257410 A1 * | 9/2017 | Gattis | H04L 65/4092 |

FOREIGN PATENT DOCUMENTS

WO   WO2004/100559   11/2004

* cited by examiner

*Primary Examiner* — Omar S Parra
(74) *Attorney, Agent, or Firm* — Merchant & Gould P.C.

(57) ABSTRACT

In one embodiment, a method includes receiving trick-mode start timestamps of trick-mode events performed on a video sequence in end-user devices such that each trick-mode start timestamp is associated with a trick-mode event performed on a video sequence in one end-user device, receiving trick-mode end timestamps of the trick-mode events, aggregating the trick-mode start timestamps according to a time value of each of the trick-mode start timestamps, aggregating the trick-mode end timestamps according to a time value of each of the trick-mode end timestamps, identifying a plurality of start clusters from the aggregation of the trick-mode start time stamps, identifying a plurality of end clusters from the aggregation of the trick-mode end time stamps, analyzing the plurality of start clusters and the plurality of end clusters, and identifying a level of engagement of a section of the video sequence based on the analyzing.

17 Claims, 5 Drawing Sheets

AUDIENCE MEASUREMENT AND FEEDBACK SYSTEM

TECHNICAL FIELD

The present disclosure generally relates to audience measurement using trick-mode data.

BACKGROUND

Viewers use trick-modes to navigate video content including the fast forward and rewind trick-mode (also known as trick-play) functions to navigate time shifted video assets, including cloud digital video recorder (DVR) recordings, traditional (hard disk) DVR recordings, video on demand (VOD) programs, and time-shifted live video. By way of introduction, a trick mode is a video playback mode characterized by a playback mode other than the normal, forward, speed 1× (real time speed). Therefore, a trick mode is characterized by a video viewing direction and a speed, for example, faster or slower than 1× or stepping or pause or even 1× or any other speed in rewind. The objective of trick modes is typically to review or resume viewing of video.

BRIEF DESCRIPTION OF THE DRAWINGS

The present disclosure will be understood and appreciated more fully from the following detailed description, taken in conjunction with the drawings in which.

DESCRIPTION OF EXAMPLE EMBODIMENTS

Overview

There is provided in accordance with an embodiment of the present disclosure, a method including receiving a plurality of trick-mode start timestamps of a plurality of trick-mode events performed on a video sequence in a plurality of end-user devices such that each one of the plurality of trick-mode start timestamps is associated with a trick-mode event of the plurality of trick-mode events performed on a video sequence in one of the plurality of end-user devices, receiving a plurality of trick-mode end timestamps of the plurality of trick-mode events such that each one of the plurality of trick-mode end timestamps is associated with a trick-mode event of the plurality of trick-mode events performed in one of the plurality of end-user devices, aggregating the plurality of trick-mode start timestamps a time value of each of the plurality of trick-mode start timestamps, aggregating the plurality of trick-mode end timestamps a time value of each of the plurality of trick-mode end timestamps, identifying a plurality of start clusters from the aggregation of the plurality of trick-mode start time stamps, identifying a plurality of end clusters from the aggregation of the plurality of trick-mode end time stamps, analyzing the plurality of start clusters and the plurality of end clusters, and identifying a level of engagement of a section of the video sequence based on the analyzing.

DETAILED DESCRIPTION

Figure 1:
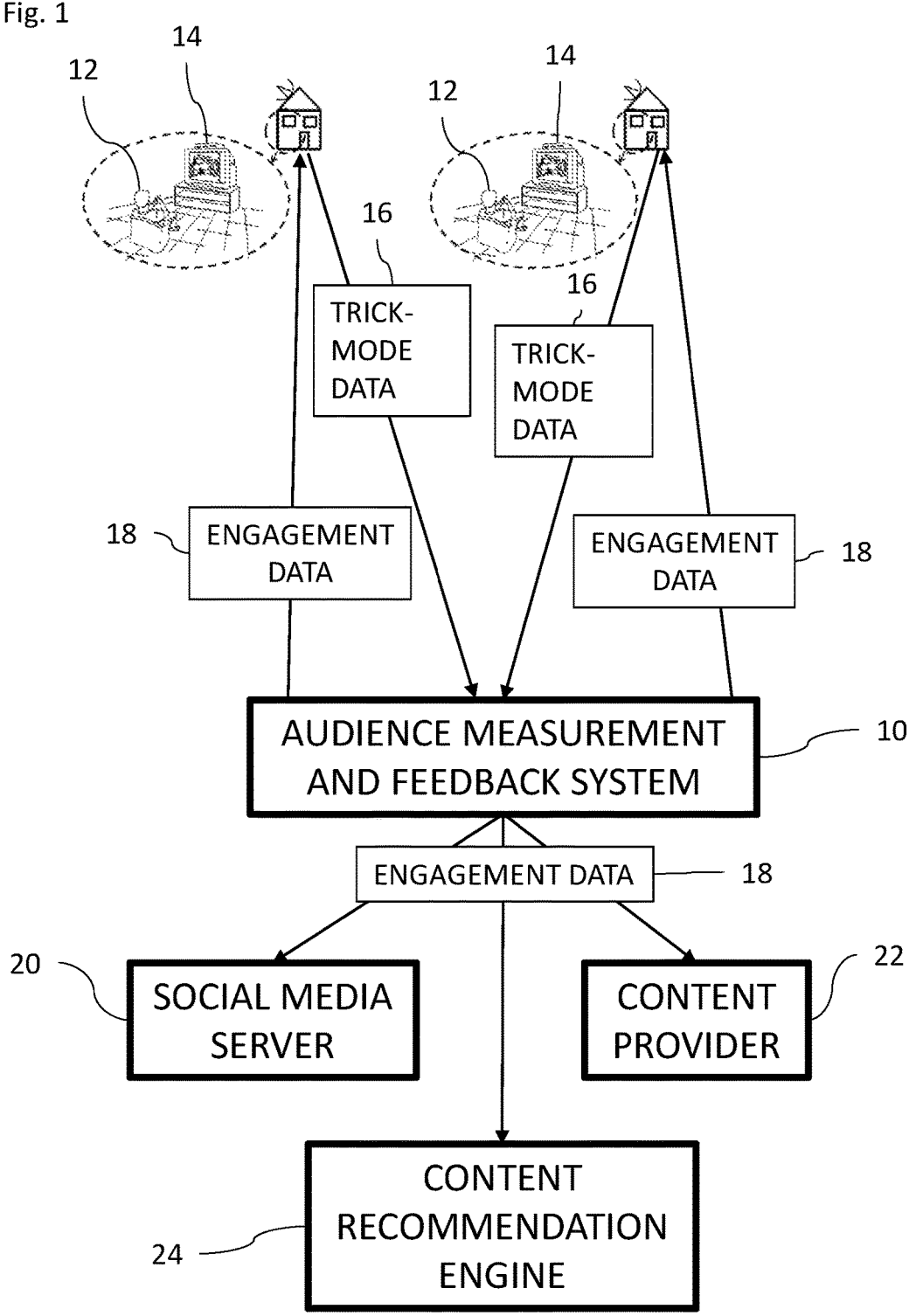
FIG. 1 is a partly pictorial, partly block diagram view of an audience measurement and feedback system and other elements constructed and operative in accordance with an embodiment of the present disclosure.

Reference is now made to FIG. 1, which is a partly pictorial, partly block diagram view of an audience measurement and feedback system 10 and other elements constructed and operative in accordance with an embodiment of the present disclosure. As subscribers 12 navigate through video content using trick-mode fast forward and trick-mode rewind, the receiver-decoder device 14 of each subscriber 12 tracks each trick-mode event, including an associated trick-mode start time (corresponding to when the subscriber 12 first pressed the fast-forward or rewind button) and an associated trick-mode end time (corresponding to when the subscriber 12 released the fast-forward or rewind button or otherwise resumed normal play) for each trick-mode event and an identification (ID) of the video content, for example, but not limited to: a content ID; or channel/service and date of the video content and optionally a title of the video content. The trick-mode start times and end times are saved as timestamps and are forwarded to the audience measurement and feedback system 10 along with the ID of the content and optionally an ID of the receiver-decoder device 14 or another unique ID associated with the receiver-decoder device 14 (for example, but not limited to, an ID of a smart card inserted into the receiver-decoder device 14) via a suitable transmission medium (for example, but not limited to, Internet Protocol, cable, cellular network) as trick-mode data 16 for analysis. The timestamps may be time offsets relative to the beginning of each content item or timestamps included in the video sequence, for example, but not limited to, presentation time stamps (PTS) or program clock reference (PCR) of the video content. The timestamps may be derived from various values, for example, but not limited to, press and release of remote control keys or by the duration of time a key is pressed, or the consecutive number of presses of the same key. However, the derivation of the entry point into a video sequence may need to reflect that there is data trapped (or sitting) in the one or more repositories between the emission point (server, cloud etc.) and a video bit buffer employed by a video decoder that reads a time stamp.

The trick-mode data 16 is processed by the audience measurement and feedback system 10 to identify an engagement level of different sections of the content using the trick-mode data 16. The audience measurement and feedback system 10 assumes that content which has been fast-forwarded over is low engagement content (e.g., objectionable content or boring content) and content which has been rewound to play again is high engagement content (e.g., a sports highlight, a funny scene), as will be described in more detail below with reference to FIGS. 3-7. The engagement levels are typically stored as engagement data 18. The engagement data 18 may also include an identification of each section of the content having an engagement level and/or a copy of each section of the content having an engagement level. The engagement level of a section of content may be defined as audience engagement in the section of content and represents the degree that the viewers of the section of content are actively viewing and interested in the content. For example, a highly engaged audience may discuss the content with other people in the room or online; a poorly engaged audience may check unrelated messages on their phone or switch away from the content altogether. The engagement data 18 may be shared with the receiver-decoder devices 14, one or more social media servers 20, one or more content providers 22 and/or one or more content recommendation engines 24, by way of example only. The engagement data 18 may be shared by sending the engagement data 18 to a remote device and/or by providing external access to the engagement data 18 residing on the audience measurement and feedback system 10 via a user interface such as a web console.

Figure 2:
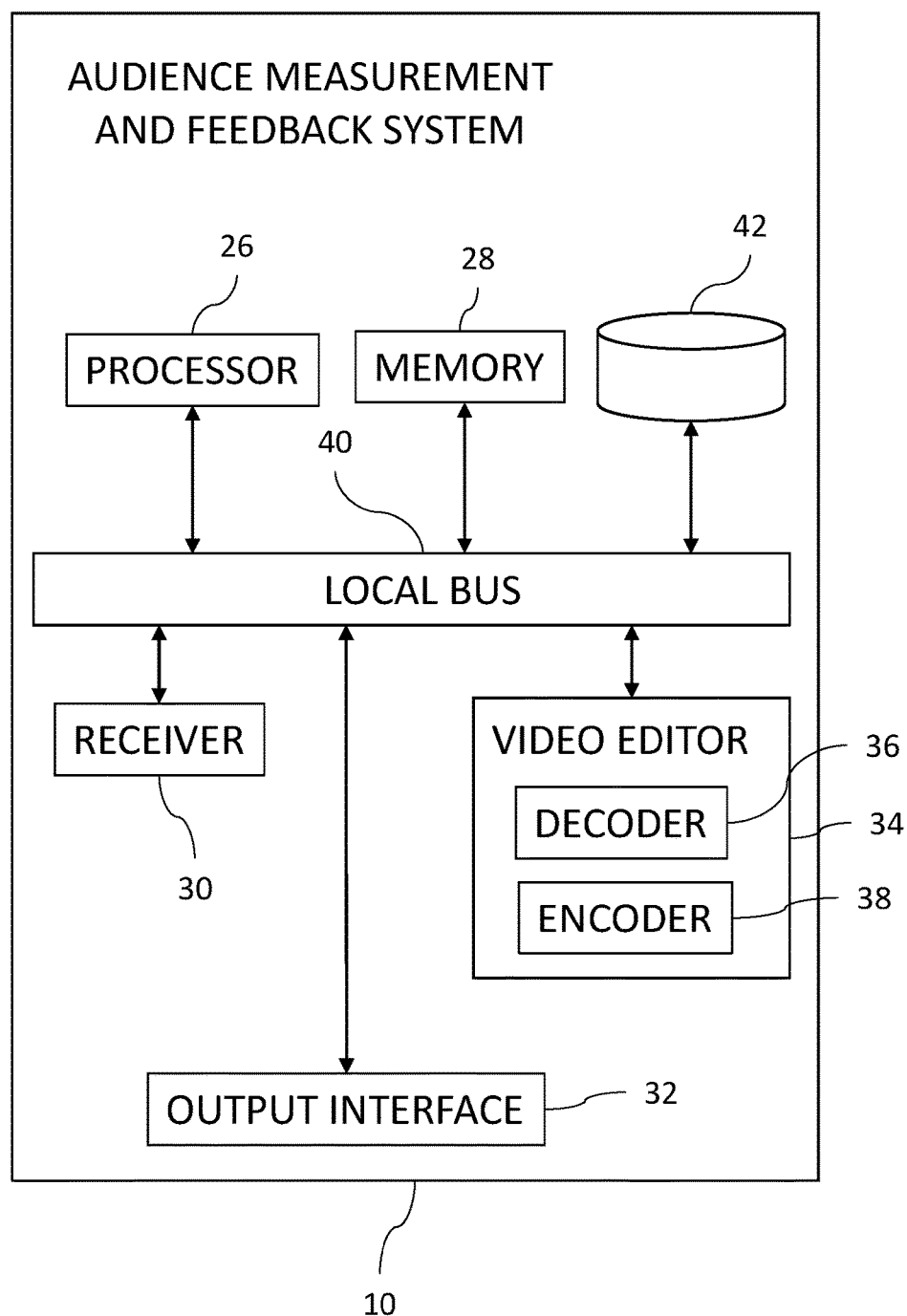
FIG. 2 is a detailed block diagram view of the audience measurement and feedback system of FIG. 1.

Reference is now made to FIG. 2, which is a detailed block diagram view of the audience measurement and feedback system 10 of FIG. 1. The audience measurement and feedback system 10 includes: a processor 26; a memory 28; a receiver 30; an output interface 32; a video editor 34 including a decoder 36 and an encoder 38; a local bus 40; and a storage device 42. The memory 28 is operative to store data used by the processor 26. The local bus is operative to connect the elements of the audience measurement and feedback system 10 together for data transfer purposes between the various elements of the audience measurement and feedback system 10. The processor 26, the receiver 30, the output interface 32, the video editor 34 and the storage device 42 are described in more detail below with reference to FIGS. 3-7.

Figure 3:
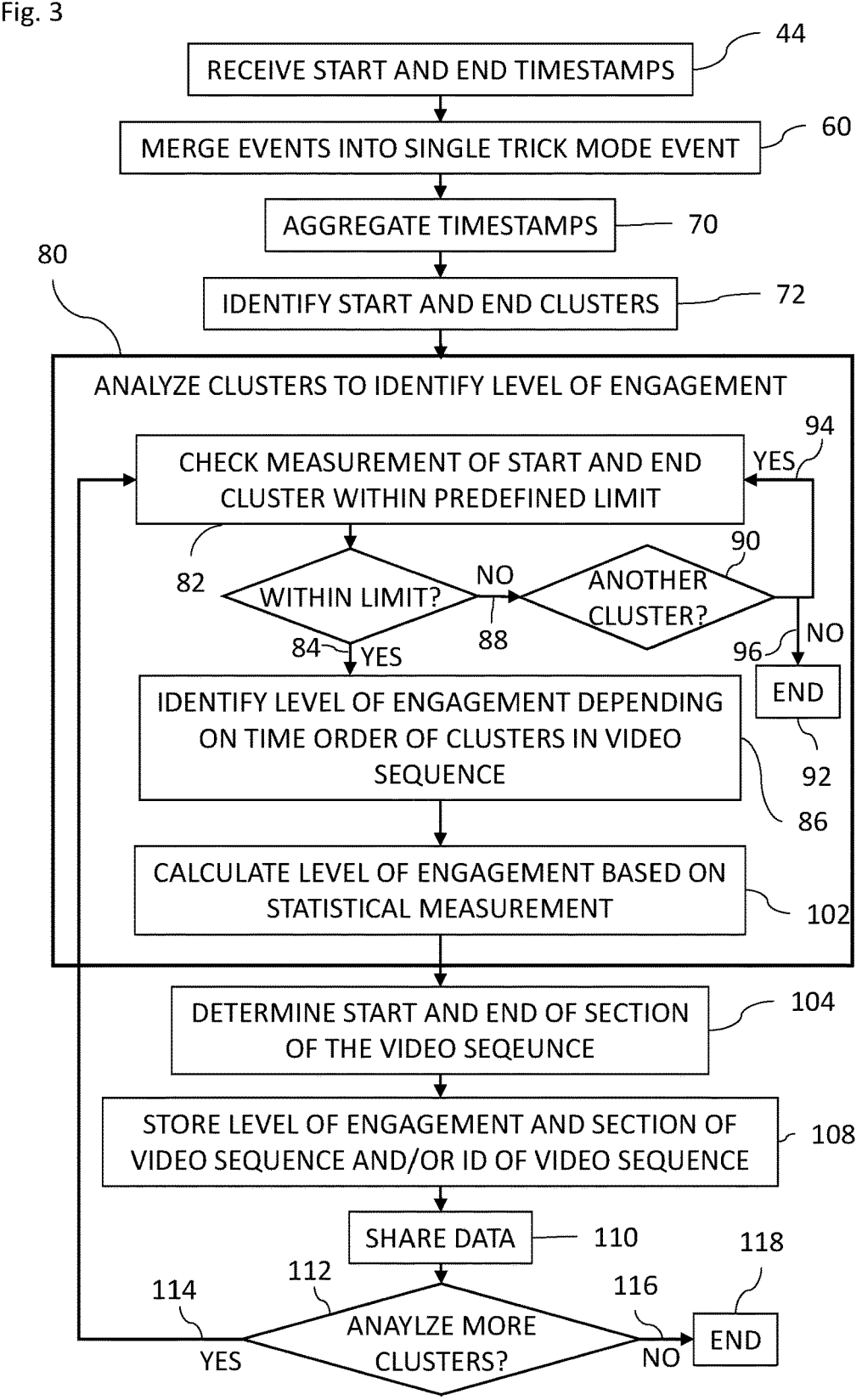
FIG. 3 is a flow chart showing an exemplary method of operation of the system of FIG. 1.

Reference is now made to FIG. 3, which is a flow chart showing an exemplary method of operation of the system 10 of FIG. 1. The receiver 30 (FIG. 2) is operative to receive the engagement data 18 (FIG. 1) including a plurality of trick-mode start timestamps and a plurality of trick-mode end timestamps of a plurality of trick-mode events performed on a video sequence in a plurality of end-user devices 14 (block 44).

Figure 4:
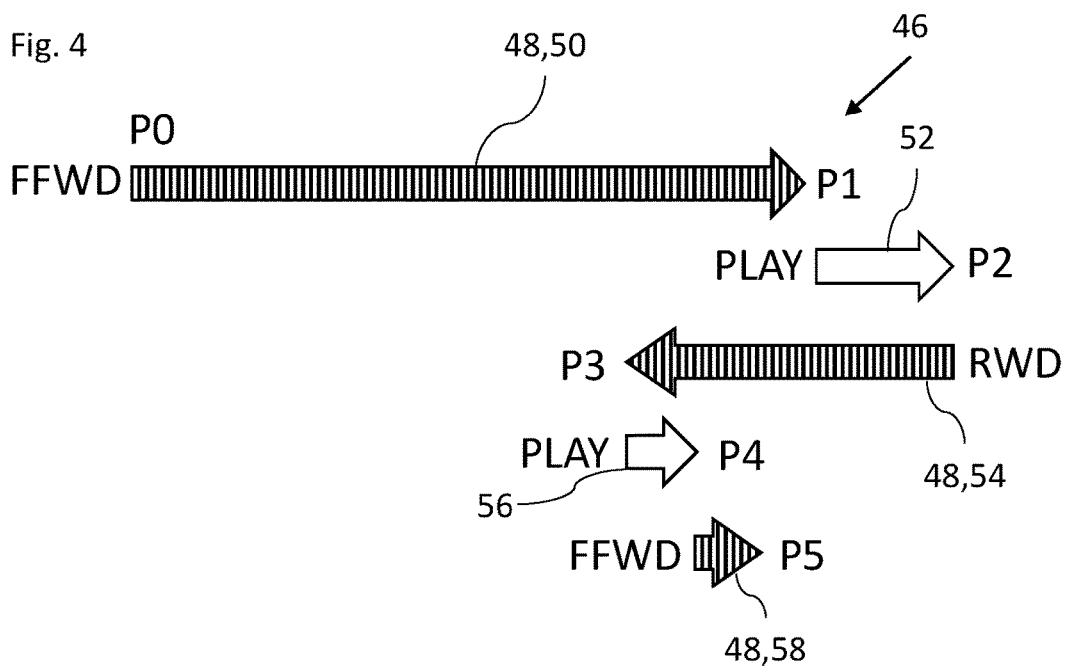
FIG. 4 is a diagram showing multiple trick-mode sub-events for use in the system of FIG. 1.

Reference is now made to FIG. 4, which is a diagram showing multiple trick-mode sub-events 48 for use in the system 10 of FIG. 1. Consecutive trick-mode operations that occur in rapid succession may be combined into a single trick-mode event. The definition of "in rapid succession" is generally system configurable. By way of example only, trick-mode events separated by less than 1-5 seconds may be good candidates for merging into a single trick-mode event. In the example of FIG. 4, the subscriber 12 (FIG. 1) has first fast-forwarded (arrow 50) from position P0 to position P1 in the video content, and then lets the content play (arrow 52) until position P2. The subscriber 12 then realizes that position P2 is too advanced in the content so the subscriber 12 then rewinds (arrow 54) to position P3. The subscriber 12 then lets the content play (arrow 56) until position P4 and then realizes that position P4 is too early in the content. The subscriber 12 then fast-forwards (arrow 58) to position P5. The three trick-mode events really represent a single trick-mode event of fast-forwarding from position P0 to position P5.

Reference is again made to FIG. 3. The processor 26 (FIG. 2) is operative to merge a first trick-mode event and a second trick-mode event of the plurality of trick-mode events into a single trick-mode event when the time elapsed between ending the first trick-mode event and starting the second trick-mode event is less than a predetermined value, for example, but not limited to, 1-5 seconds (block 60). It will be appreciated that two or more trick-mode events may be merged together if the gap between adjacent trick-mode events is less than a predetermined value. It will be appreciated that merging trick-modes events from the same subscriber 12 (FIG. 1) generally includes identifying the trick-mode events which originate from the same subscriber 12. The ID of the receiver-decoder device 14 or another unique ID associated with the receiver-decoder device 14 may be used to identify trick-mode events originating from the same subscriber 12.

Figure 5:
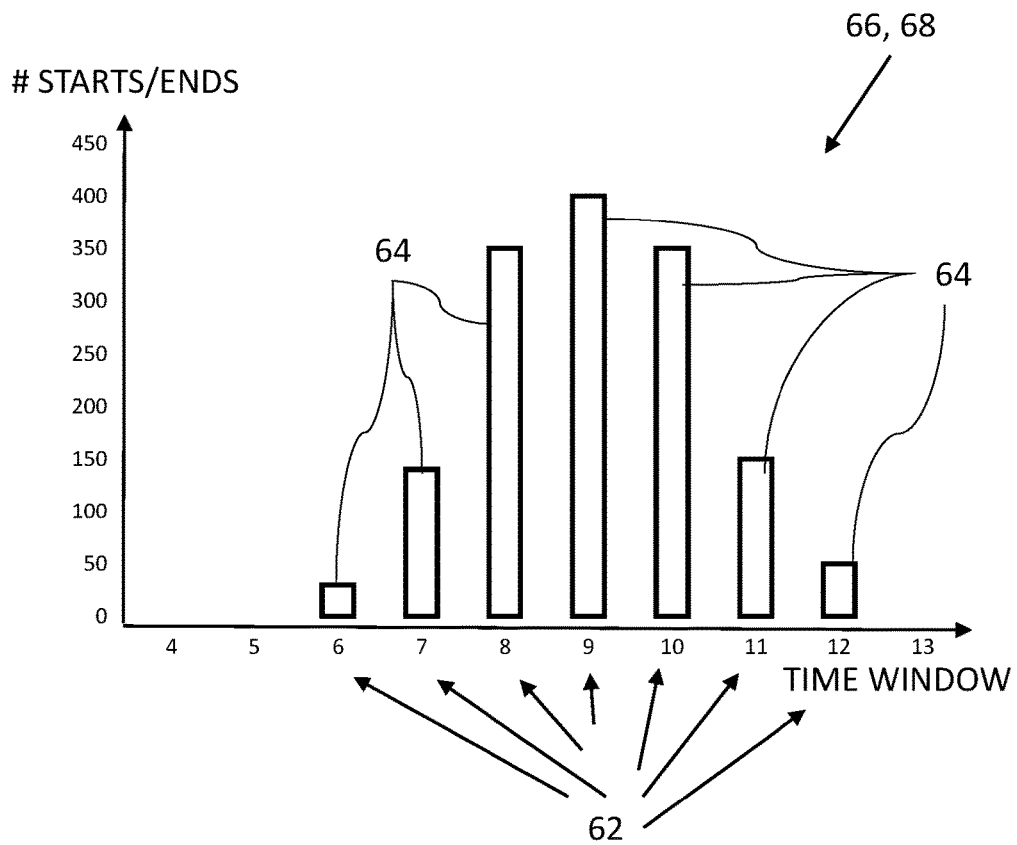
FIG. 5 is a chart illustrating aggregation of trick-mode start and end timestamps in time windows for use in the system of FIG. 1.

Reference is now made to FIG. 5, which is a chart illustrating aggregation of trick-mode start and end timestamps in time windows 62 for use in the system 10 of FIG. 1. The received trick-mode start and end times are then aggregated according to a time value of the trick-mode timestamps. A time value may be the value of a PTS or PCR or other timestamp measured in any suitable time unit, for example in seconds or milliseconds. FIG. 5 shows some start or end timestamps being aggregated by time windows 62 yielding a histogram 66. The histogram 66 of FIG. 5 includes one cluster 68 of timestamps representing part of a trick-mode event; either the start or end of a trick-mode event. The height of each bar 64 in the histogram 66 represents the number of timestamps aggregated in each time window 62. The histogram 66 has a generally bell shape distribution and will be described in more detail below with reference to FIG. 6. The histogram 66 has a mean value in the time window of 9 seconds and the histogram has a magnitude. The magnitude is the number of timestamps in the cluster 68 of the histogram 66. In the example of FIG. 5, the cluster 68 has a magnitude of 1470 representing 1470 trick-mode start or end timestamps. The cluster 68 may also have other statistical values such as standard deviation. Expanding the time window axis enables plotting further clusters of timestamps, described below with reference to FIG. 6.

Figure 6:
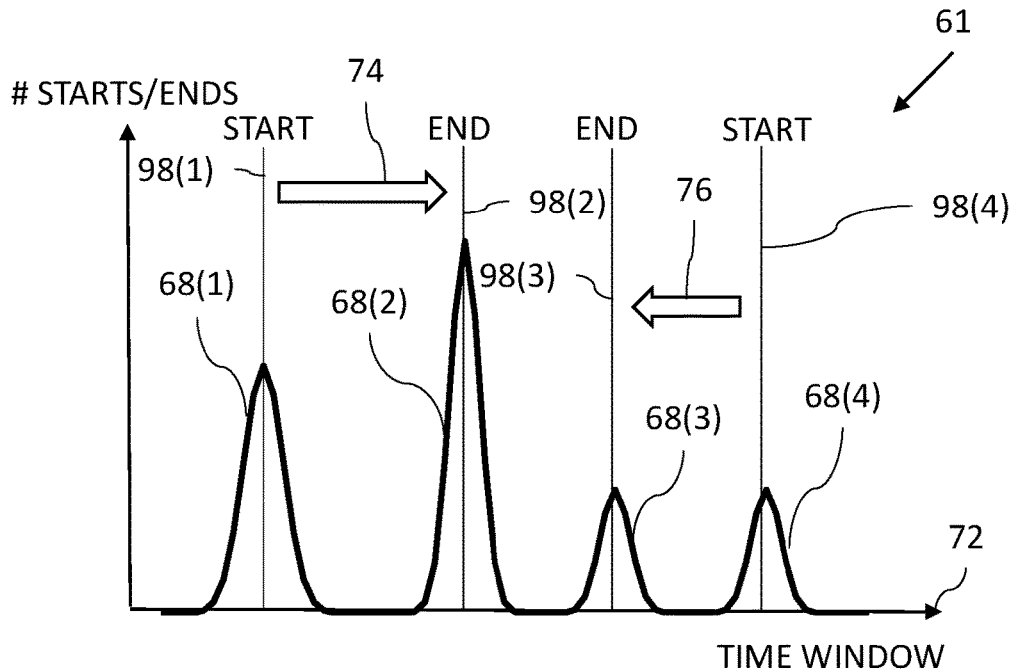
FIG. 6 is a chart showing clusters of trick-mode data for use in the system of FIG. 1.

Reference is now made to FIG. 6, which is a chart 61 showing clusters 68 of trick-mode data for use in the system 10 of FIG. 1. Reference is also made to FIG. 3. It should be noted that the trick-mode timestamps may be aggregated yielding the clusters 68 either by aggregating the timestamps into time windows according to the time value of each timestamp or by aggregating the timestamps according to the time value of each timestamp without aggregating the timestamps into time windows. FIG. 6 shows four clusters 68 of trick mode data, clusters 68(1)-68(4). Clusters 68(1) and 68(4) generally include start timestamps, based on the details included in the received engagement data 18. The clusters 68(1) and 68(4) are described herein as start clusters. Clusters 68(2) and 68(3) generally include end timestamps (based on the details included in the received engagement data 18) and are described herein as end clusters. An end cluster may also be described as a high interest cluster as the subscribers 12 are using a trick-mode to get to that point in the content and a start cluster may also be described as a low interest cluster as the subscribers 12 are using a trick-mode to leave that point in the content. In the example of FIG. 6, the magnitude of start cluster 68(1) is substantially the same as the magnitude of end cluster 68(2) even though start cluster 68(1) is shorter and wider than end cluster 68(2). As both clusters 68(1), 68(2) have the same magnitude, it may be assumed that the same subscribers 12 (FIG. 1) started a trick-mode event around start cluster 68(1) and ended the trick-mode event around end cluster 68(2). Additionally, as the start cluster 68(1) precedes the end cluster 68(2) along the direction of a time line 72, it may be assumed that the subscribers 12 are fast-forwarding (arrow 74) over non-interesting content. It should be noted that playing content slowly or stepping frame by frame and/or playing captions and/or raising volume may be an indication that viewers are scrutinizing content and therefore in such a case the section may be of high interest and not low interest. Therefore, timestamps related to playing content slowly or stepping frame by frame and/or playing captions and/or raising volume may need to be aggregated separately and analyzed accordingly. In the example of FIG. 6, the magnitude of start cluster 68(4) is substantially the same as the magnitude of end cluster 68(3). As both clusters 68(3), 68(4) have the same magnitude, it may be assumed that the same subscribers 12 started a trick-mode event around start cluster 68(4) and ended the trick-mode event around end cluster 68(3). Additionally, as the end cluster 68(3) precedes the start cluster 68(4) along the direction of the time line 72, it may be assumed that the subscribers 12 are rewinding (arrow 76) over interesting content to watch it again.

The processor 26 (FIG. 2) is operative to aggregate the trick-mode start timestamps according to a time value of each trick-mode start timestamp and aggregate the trick-mode end timestamps according to a time value of each trick-mode end timestamp (block 70). The term "aggregate" is defined to include compiling the timestamps in accordance with a time value of the timestamps for use in statistical analysis. The processor 26 is operative to: identify a plurality of start clusters 68 from the aggregation of the trick-mode start time stamps and identify a plurality of end clusters 68 from the aggregation of the trick-mode end time stamps (block 78). Each of the start and end clusters 68 exhibits a statistical distribution having a plurality of statistical measurements, for example, but not limited to, mean and standard deviation. It should be noted that the magnitude (the number of data points) of the cluster 68 is an indication of engagement (the intensity of interest or disinterest) in the section of content that the trick-mode event of the cluster 68 belongs to. The percentage of subscribers 12 represented in one of the clusters 68, also described herein as participation, may also be an indication of level engagement in a section of the content.

The processor 26 (FIG. 2) is operative to analyze the start clusters 68 and the end clusters 68. The processor 26 (FIG. 2) is operative to identify a level of engagement of a section of the video sequence based on the analysis of the start clusters 68 and the end clusters 68 (block 80). The sub-steps of block 80 is now described in more detail. The processor 26 is operative to check if a measurement (e.g., magnitude) of a start cluster 68 is within a predefined limit of a measurement (e.g., magnitude) of an end cluster 68 (block 82) thereby providing a positive indication that the start cluster and the end cluster 68 belong to the same trick-mode event. The predefined limit may be any suitable limit, for example, the measurements of two clusters 68 may differ by a certain percentage, for example, but not limited to, 5% or 20%. The processor 26 will first start comparing the measurements of adjacent clusters 68 before trying more distant clusters 68. If the measurement of the start cluster is within the predefined limit of the measurement of the end cluster 68 being compared (branch 84), the processor 26 is operative to identify the level of engagement of the section of the video sequence (defined by the start and end cluster 68) depending on an order of the end cluster 68 and the start cluster 68 according to a time order of the video sequence (block 86). If the start cluster 68 precedes the end cluster 68 according to the time order of the video sequence, the level of engagement is lower than if the end cluster 68 precedes the start cluster 68 according to the time order of the video sequence, as described above. So the order of the start and end cluster 68 in the time order gives a first approximation of the level of engagement of the section of the content defined by the start cluster 68 and end cluster 68.

If the measurements compared in the step of block 82 are not within the predefined limit (branch 88), the processor 26 (FIG. 2) determines other cluster(s) 68 (starting with the most adjacent clusters 68 and then continuing with the next adjacent neighboring clusters 68) (block 90), if available (branch 94), for comparison in the step of block 82. The processor 26 may select a new start cluster 68 and/or end cluster 68 for comparison in the step of block 90. A limit may be set as to which distance of neighboring clusters 68 will be considered for comparison purposes. If there are no other clusters 68 (branch 96) for comparison, the process typically ends (block 92).

The processor 26 (FIG. 2) is operative to calculate the level of engagement also using at least one statistical measurement of the end cluster 68 and/or the start cluster 68 (block 102). For example, if level of engagement is given a value between −10 and +10, +10 being the most interesting content, then if 5% of the subscribers 12 (FIG. 1) (5% participation) skip over a section of content that may indicate a level of engagement of possibly −1, but if 95% of the subscribers 12 (95% participation) skip over the section of content that may indicate a level of engagement of −10. It will be appreciated that the above example can also be applied to high engagement content. By way of another example, a section of the content which has already been defined as high value or interesting or high engagement content based on the order of the start and end clusters 68 defining the section, if the magnitude of the start or end cluster 68 is two standard deviations or more above the mean value, then the section may be exceptionally engaging and receive a score of +10. It will be appreciated that the ratio of magnitude and standard deviation may be used to calculate a score anywhere between 0 and +10. Similarly, it will be appreciated that the above example can also be applied to low engagement content to calculate a score between 0 and −10.

The mean time offset values (lines 98) of the start and end clusters 68 may be used to delineate the boundaries of the section of content. So for the section of content defined by the clusters 68(1), 68(2), the mean time offsets 98(1), 98(2) may be used to define that section of the content. Similarly, for the section of content defined by the clusters 68(3), 68(4), the mean time offsets 98(3), 98(4) may be used to define that section of the content. Therefore, the processor 26 (FIG. 2) is operative to determine the start and end of the section of the video sequence based on a statistical value (e.g., the mean) of the start cluster 68 and the end cluster 68, respectively (block 104). Alternatively, the boundaries of the section of content may be adjusted by another factor for example, but not limited plus or minus a fraction of a standard deviation of the cluster 68 concerned.

Figure 7:
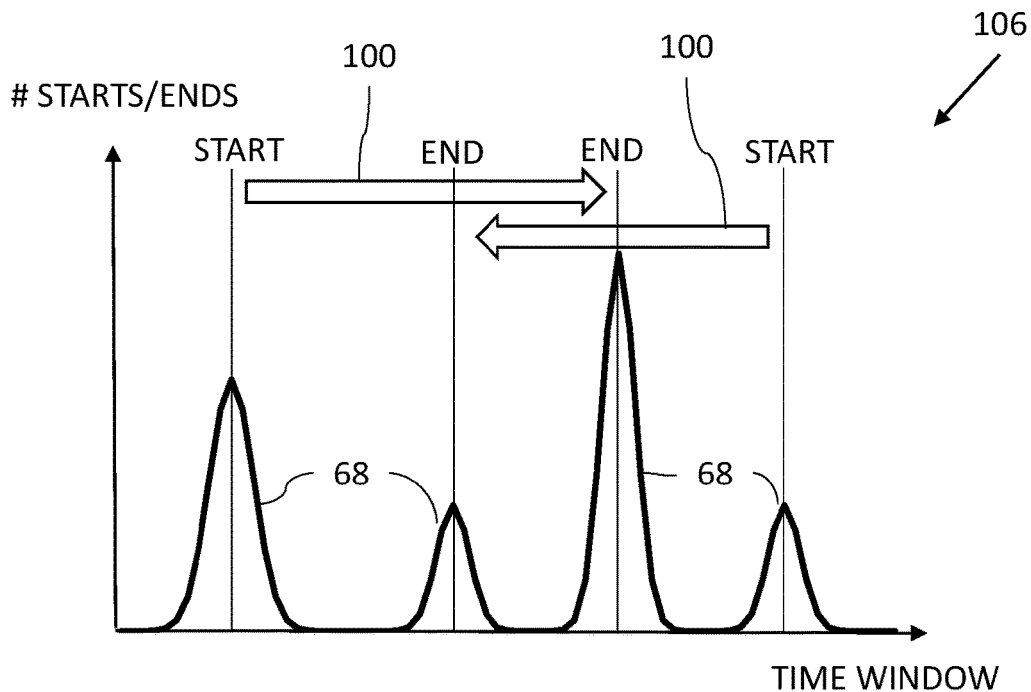
FIG. 7 is a chart showing more clusters of trick-mode data for use in the system of FIG. 1.

Reference is now made to FIG. 7, which is a chart 106 showing more clusters 68 of trick-mode data for use in the system 10 of FIG. 1. It should be noted that in FIG. 7 two trick mode events have been identified shown by arrows 100. The arrows 100 show that the two trick-mode events overlap. Although this is considered to be an unlikely scenario, and may actually in some case indicate that both events should be ignored due to contradictory data, the audience measurement and feedback system 10 may still determine which clusters 68 match up with each other to form trick mode events using the step of block 82 of FIG. 3 where start and end clusters 68 are compared to determine if they have similar measurements, e.g., magnitudes.

Reference is again made to FIG. 3. The video editor 34 (FIG. 2) is operative to decode the video sequence using the decoder 36 (FIG. 2) and re-encode the section of the video sequence using the encoder 38 (FIG. 2) to encode the section of the video sequence as separately decodable item. Alternatively, the start point of the section may be extended to a previous random access point so that the section can be extracted from the original video sequence without requiring decoding and re-encoding. The processor 26 (FIG. 2) is operative to store, in the storage device 42 (FIG. 2), the level of engagement of the section of the video sequence and the section of the video sequence and/or an identification (e.g., time offsets or timestamps) of the section of the video sequence (block 108). The statistical data about the clusters 68 may optionally be stored in the storage device 42 for later use. The video segment storage policy may be configurable based on one or more of the following: the source (e.g., who provided the content) of the content (e.g., how important the source of content is considered by an operator of the audience measurement and feedback system 10 or a content provider, by way of example only); and the total number of segments to store (e.g., an operator may only want to store a configurable number of segments and no more), by way of example only. Storing the sections of video is generally performed to provide added context to the levels of engagement calculated by the audience measurement and feedback system 10.

The output interface 32 (FIG. 2) is operative to share the level of engagement of the section of the video sequence and the section of the video sequence and/or an identification (e.g., time offsets or timestamps) of the section of the video sequence with one or more of the following: the receiver-decoder devices 14 (FIG. 1), one or more social media servers 20 (FIG. 1), one or more content providers 22 (FIG. 1) and/or one or more content recommendation engines 24 (FIG. 1), by way of example only (block 110). The processor 26 (FIG. 2) checks if there are more clusters 68 (FIG. 6) to analyze (block 112). If there are more clusters 68 to analyze (branch 114), the processing continues with the step of block 82. If there are no more clusters to analyze (branch 116), the process ends (block 118). It should be noted that the above steps may be performed in any suitable order. In particular, the sharing of the engagement data 18 (FIG. 1) may be performed per section of content or in batch for several sections of content.

Reference is again made to FIG. 1. As the system 10 is fully automated and does not require external metadata apart from the trick-mode data 16, there are the following processing and bandwidth improvements: processing efficiencies are provided in the receiver-decoder devices 14 (which do not need to process other audience measurements and run other user interfaces to receive user input of other audience measurements); bandwidth efficiencies are provided by minimizing the data transferred from the receiver-decoder devices 14 to the audience measurement and feedback system 10; processing efficiencies are provided in the audience measurement and feedback system 10 as aggregating the timestamp data and analyzing the clusters 68 (FIG. 6) may be performed in batch for all the subscribers 12 or a group of the subscribers 12.

The engagement data 18 may be used for social bookmarks marking content with a level of engagement and a group, for example, "group X likes content section Y". Content providers 22 may use the engagement data 18 to decide which sections to skip and which sections to repeat and how to avoid boring plots in the future. The audience measurement and feedback system 10 identifies both predictable points of interest (e.g. the start and end of a commercial break) and unpredictable events like a big sports play highlight or a wardrobe malfunction. The audience measurement and feedback system 10 allows content providers 22 to the informatively decide how commercials and other content are presented to the subscribers 12. The audience measurement and feedback system 10 provides a new method for subscribers 12 to discover content based on the engagement data 18.

In practice, some or all of these functions may be combined in a single physical component or, alternatively, implemented using multiple physical components. These physical components may comprise hard-wired or programmable devices, or a combination of the two. In some embodiments, at least some of the functions of the processing circuitry may be carried out by a programmable processor under the control of suitable software. This software may be downloaded to a device in electronic form, over a network, for example. Alternatively or additionally, the software may be stored in tangible, non-transitory computer-readable storage media, such as optical, magnetic, or electronic memory.

It is appreciated that software components may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present disclosure.

It will be appreciated that various features of the disclosure which are, for clarity, described in the contexts of separate embodiments may also be provided in combination in a single embodiment. Conversely, various features of the disclosure which are, for brevity, described in the context of a single embodiment may also be provided separately or in any suitable sub-combination.

It will be appreciated by persons skilled in the art that the present disclosure is not limited by what has been particularly shown and described hereinabove. Rather the scope of the disclosure is defined by the appended claims and equivalents thereof.

What is claimed is:
1. A method comprising:
receiving a plurality of trick-mode start timestamps of a plurality of trick-mode events performed on a video sequence in a plurality of end-user devices such that each one of the plurality of trick-mode start timestamps is associated with a trick-mode event of the plurality of trick-mode events performed in one of the plurality of end-user devices;
receiving a plurality of trick-mode end timestamps of the plurality of trick-mode events such that each one of the plurality of trick-mode end timestamps is associated with a trick-mode event of the plurality of trick-mode events performed in one of the plurality of end-user devices;
aggregating the plurality of trick-mode start timestamps according to a time value of each of the plurality of trick-mode start timestamps;
aggregating the plurality of trick-mode end timestamps according to a time value of each of the plurality of trick-mode end timestamps;

identifying a plurality of start clusters from the aggregation of the plurality of trick-mode start time stamps;

identifying a plurality of end clusters from the aggregation of the plurality of trick-mode end time stamps;

analyzing the plurality of start clusters and the plurality of end clusters;

identifying a level of engagement of a section of the video sequence based on the analyzing;

checking if a measurement of one start cluster of the plurality of start clusters is within a predefined limit of a measurement of one end cluster of the plurality of end clusters:

if the measurement of the one start cluster is within the predefined limit of a measurement of the one end cluster, identifying the level of engagement of the section of the video sequence depending on an order of the one end cluster and the one start cluster according to a time order of the video sequence; and providing processing efficiencies in an audience measurement and feedback system.

2. The method according to claim 1, further comprising storing the level of engagement of the section of the video sequence and at least one of: an identification of the section of the video sequence; or the section of the video sequence.

3. The method according to claim 1, further comprising identifying the level of engagement of the section of the video sequence depending on an order of one end cluster of the plurality of end clusters and one start cluster of the plurality of start clusters according to a time order of the video sequence.

4. The method according to claim 1, wherein if the one start cluster precedes the one end cluster according to the time order of the video sequence, the level of engagement is lower than if the one end cluster precedes the one start cluster according to the time order of the video sequence.

5. The method according to claim 4, further comprising calculating the level of engagement also using at least one statistical measurement of at least one of: the one end cluster; or the one start cluster.

6. The method according to claim 1, further comprising determining a start and end of the section of the video sequence based on a statistical value of the one start cluster and the one end cluster, respectively.

7. The method according to claim 1, further comprising sharing the level of engagement of the section of the video sequence with one or more of the following: a social media source; an end-user device; a content provider; and a content recommendation engine.

8. The method according to claim 1, further comprising merging a first trick-mode event and a second trick-mode event of the plurality of trick-mode events into a single trick-mode event when the time elapsed between ending the first trick-mode event and starting the second trick-mode event is less than a predetermined value.

9. A system comprising:

a receiver to:

receive a plurality of trick-mode start timestamps of a plurality of trick-mode events performed on a video sequence in a plurality of end-user devices such that each one of the plurality of trick-mode start timestamps is associated with a trick-mode event of the plurality of trick-mode events performed on a video sequence in one of the plurality of end-user devices; and receive a plurality of trick-mode end timestamps of the plurality of trick-mode events such that each one of the plurality of trick-mode end timestamps is associated with a trick-mode event of the plurality of trick-mode events performed in one of the plurality of end-user devices; and a processor to:

aggregate the plurality of trick-mode start timestamps according to a time value of each of the plurality of trick-mode start timestamps;

aggregate the plurality of trick-mode end timestamps according to a time value of each of the plurality of trick-mode end timestamps;

identify a plurality of start clusters from the aggregation of the plurality of trick-mode start time stamps;

identify a plurality of end clusters from the aggregation of the plurality of trick-mode end time stamps;

analyze the plurality of start clusters and the plurality of end clusters;

identify a level of engagement of a section of the video sequence from the analysis of the plurality of start clusters and the plurality of end clusters;

check if a measurement of one start cluster of the plurality of start clusters is within a predefined limit of a measurement of one end cluster of the plurality of end clusters:

if the measurement of the one start cluster is within the predefined limit of a measurement of the one end cluster, identify the level of engagement of the section of the video sequence depending on an order of the one end cluster and the one start cluster according to a time order of the video sequence; and provide processing efficiencies in the audience measurement and feedback system.

10. The system according to claim 9, wherein the processor is operative to store the level of engagement of the section of the video sequence and at least one of: the section of the video sequence; or an identification of the section of the video sequence.

11. The system according to claim 9, wherein: each one of the plurality of start clusters and each one of the plurality of end clusters exhibits a statistical distribution having a plurality of statistical measurements; and the processor is operative to calculate the level of engagement using at least one of the plurality of statistical measurements of at least one of: one end cluster of the plurality of end clusters; or one start cluster of the plurality of start clusters.

12. The system according to claim 9, wherein the processor is operative to identify the level of engagement of the section of the video sequence depending on an order of one end cluster of the plurality of end clusters and one start cluster of the plurality of start clusters according to a time order of the video sequence.

13. The system according to claim 9, wherein if the one start cluster precedes the one end cluster according to the time order of the video sequence, the level of engagement is lower than if the one end cluster precedes the one start cluster according to the time order of the video sequence.

14. The system according to claim 13 wherein the processor is operative to calculate the level of engagement also using at least one statistical measurement of at least one of: the one end cluster; or the one start cluster.

15. The system according to claim 9, wherein the processor is operative to determine a start and end of the section of the video sequence based on a statistical value of the one start cluster and the one end cluster, respectively.

16. The system according to claim 9, further comprising an output interface to share the level of engagement of the section of the video sequence with one or more of the following: a social media server; an end-user device; a content provider; and a content recommendation engine.

17. The system according to claim 9, wherein the processor is operative to merge a first trick-mode event and a second trick-mode event of the plurality of trick-mode events into a single trick-mode event when the time elapsed between ending the first trick-mode event and starting the second trick-mode event is less than a predetermined value.

* * * * *